United States Patent
McClung, III

(10) Patent No.: US 8,996,382 B2
(45) Date of Patent: Mar. 31, 2015

(54) LIPS BLOCKERS, HEADSETS AND SYSTEMS

(76) Inventor: Guy L. McClung, III, Rockport, TX (US)

(*) Notice: Subject to any disclaimer, the term of this patent is extended or adjusted under 35 U.S.C. 154(b) by 526 days.

(21) Appl. No.: 13/317,155

(22) Filed: Oct. 11, 2011

(65) Prior Publication Data

US 2012/0095768 A1    Apr. 19, 2012

Related U.S. Application Data

(60) Provisional application No. 61/455,090, filed on Oct. 14, 2010.

(51) Int. Cl.
| | | |
|---|---|---|
| G10L 21/00 | (2013.01) | |
| G10L 15/00 | (2013.01) | |
| H04R 1/08 | (2006.01) | |
| H04K 3/00 | (2006.01) | |

(52) U.S. Cl.
CPC ............ *H04R 1/083* (2013.01); *H04R 2420/07* (2013.01); *H04K 3/68* (2013.01); *H04K 3/825* (2013.01); *H04K 2203/12* (2013.01); *H04K 2203/14* (2013.01); *H04K 2203/16* (2013.01)
USPC ........ 704/270; 704/270.1; 704/272; 704/275; 704/278; 704/226; 704/235; 704/246

(58) Field of Classification Search
USPC .............. 704/270, 270.1, 272, 275, 278, 226, 704/235, 246
See application file for complete search history.

(56) References Cited

U.S. PATENT DOCUMENTS

| | | | |
|---|---|---|---|
| 2,538,458 A | 1/1951 | Hutchinson | |
| 3,128,352 A | 4/1964 | Cagen | 379/430 |
| 3,786,519 A | 1/1974 | Aileo | 179/156 |
| 3,889,190 A * | 6/1975 | Palmer | 455/90.3 |
| 4,374,301 A * | 2/1983 | Frieder, Jr. | 379/430 |
| 4,484,029 A * | 11/1984 | Kenney | 455/575.2 |
| 4,537,276 A * | 8/1985 | Confer | 181/21 |
| 4,620,068 A | 10/1986 | Wieder | 179/156 A |
| 4,654,883 A * | 3/1987 | Iwata | 381/380 |
| D299,337 S | 1/1989 | Wiegel | 14/206 |
| D299,643 S | 1/1989 | Kubota | 14/225 |
| 4,987,592 A | 1/1991 | Flagg | 379/430 |
| 5,101,504 A * | 3/1992 | Lenz | 455/78 |
| 5,675,658 A * | 10/1997 | Brittain | 381/72 |
| 5,806,036 A * | 9/1998 | Stork | 704/260 |
| 5,890,074 A | 3/1999 | Rydbeck et al. | 455/558 |
| 5,926,532 A * | 7/1999 | Peck | 379/175 |
| 6,079,053 A | 6/2000 | Clover, Jr. et al. | 2/424 |
| 6,185,529 B1 * | 2/2001 | Chen et al. | 704/251 |
| D443,603 S | 6/2001 | Taylor et al. | 14/206 |
| D463,784 S | 10/2002 | Taylor et al. | 14/206 |
| 6,471,420 B1 * | 10/2002 | Maekawa et al. | 704/250 |

(Continued)

*Primary Examiner* — Edgar Guerra-Erazo
(74) *Attorney, Agent, or Firm* — Guy McClung

(57) ABSTRACT

Systems and methods for inhibiting access to the lips of speaking person including a sound receiving device for receiving speech of a person speaking, the person having lips that move when the person speaks, a blocker connected to the device for blocking the lips of the person speaking while the person is speaking; and, in some aspects, such a blocker with a material addition apparatus to provide added material for the breath of a person speaking, e.g., for preventing the spread of disease or to freshen a speaker's breath. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

20 Claims, 7 Drawing Sheets

(56) References Cited

U.S. PATENT DOCUMENTS

| | | | |
|---|---|---|---|
| 6,510,311 B1 * | 1/2003 | Stitt ............................ 455/90.3 |
| 6,997,178 B1 * | 2/2006 | Reynaud .................. 128/201.19 |
| 7,082,393 B2 * | 7/2006 | Lahr ............................ 704/233 |
| D540,778 S | 4/2007 | Thompson et al. ............ 14/206 |
| D541,255 S | 4/2007 | Taylor et al. .................. 14/205 |
| D542,774 S | 5/2007 | Rausch et al. ................. 14/206 |
| 7,242,765 B2 | 7/2007 | Hairston ...................... 379/419 |
| 7,317,809 B2 | 1/2008 | Almqvist ..................... 381/371 |
| 7,365,766 B1 * | 4/2008 | Lapalme ........................ 348/61 |
| 7,392,806 B2 * | 7/2008 | Yuen et al. ............... 128/205.27 |
| 7,444,332 B2 | 10/2008 | Dettinger et al. ............. 351/158 |
| D589,492 S | 3/2009 | Mistry ........................... 14/205 |
| D602,906 S | 10/2009 | Groves et al. .................. 14/205 |
| 7,603,148 B2 | 10/2009 | Michalak ................... 455/575.2 |
| D605,629 S | 12/2009 | Suwalski et al. ................ 14/206 |
| D613,267 S | 4/2010 | Suwalski et al. ................ 14/206 |
| D616,419 S | 5/2010 | Suwalski et al. ................ 14/206 |
| D617,771 S | 6/2010 | Groves et al. .................. 14/206 |
| 8,437,491 B2 * | 5/2013 | Ward ............................ 381/376 |
| 2002/0166557 A1 * | 11/2002 | Cooper .................... 128/206.28 |
| 2002/0194005 A1 * | 12/2002 | Lahr ............................. 704/271 |
| 2004/0243416 A1 * | 12/2004 | Gardos ......................... 704/275 |
| 2005/0172968 A1 * | 8/2005 | Hishida ................... 128/206.19 |
| 2008/0089546 A1 * | 4/2008 | Ward ............................ 381/376 |
| 2008/0304690 A1 * | 12/2008 | Poindexter ................... 381/375 |
| 2010/0034412 A1 * | 2/2010 | Parda .......................... 381/355 |

* cited by examiner

Fig. 1
*Prior Art* (US 7,242,765)
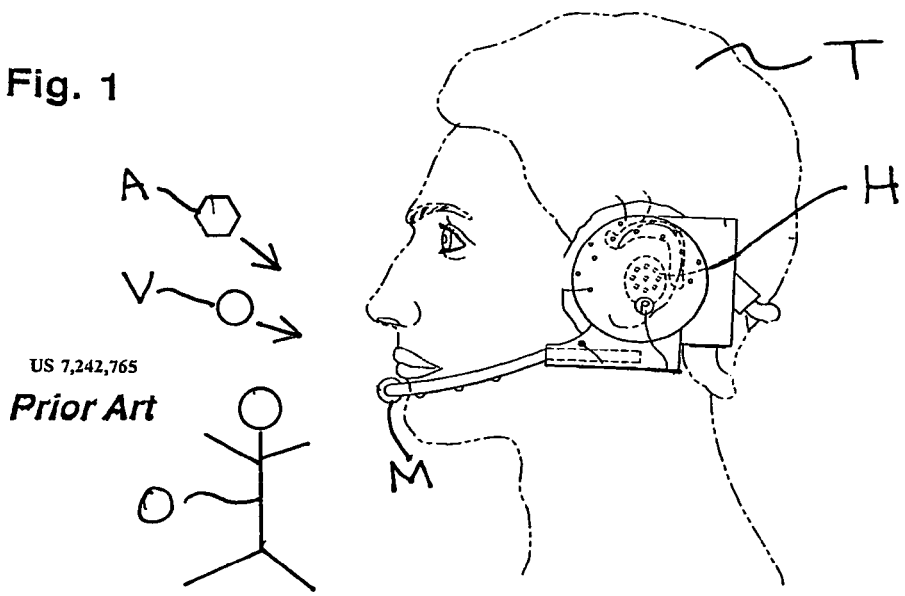
Fig. 2A
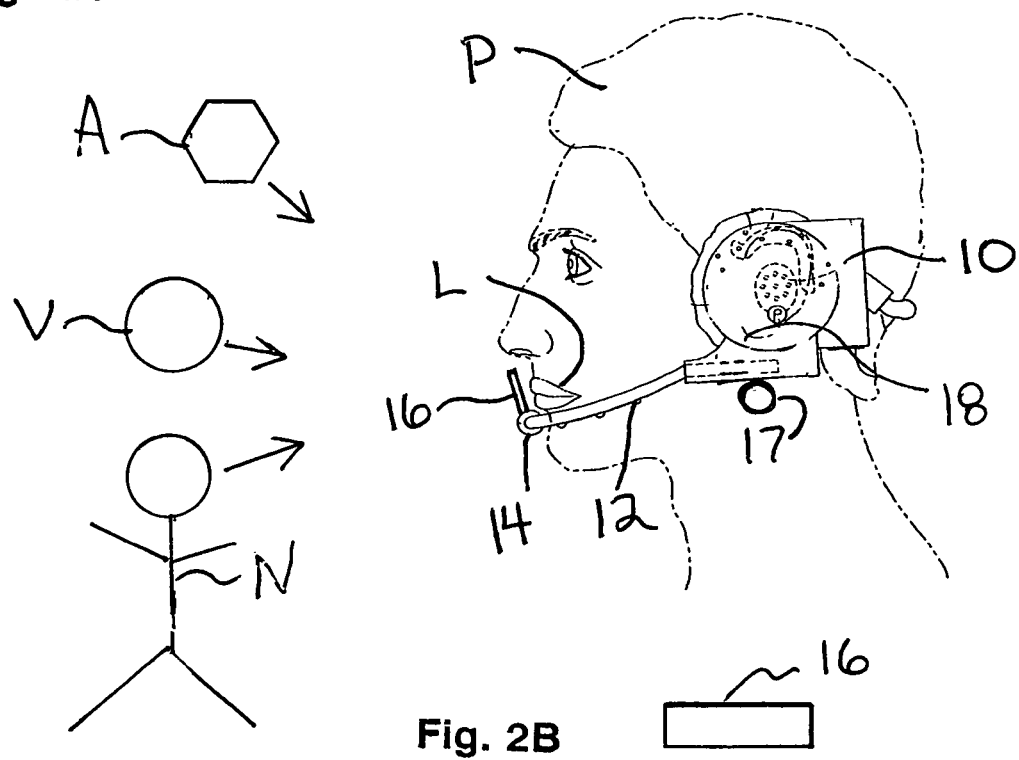
Fig. 2B

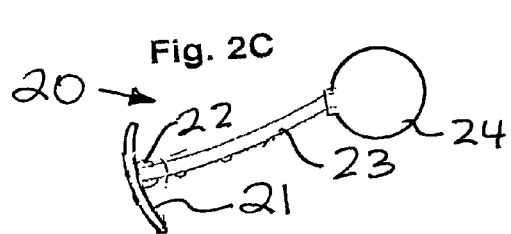 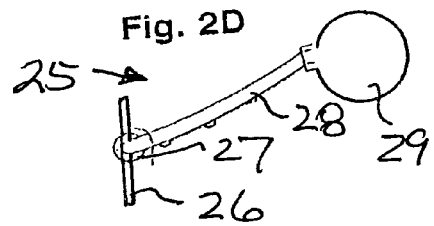
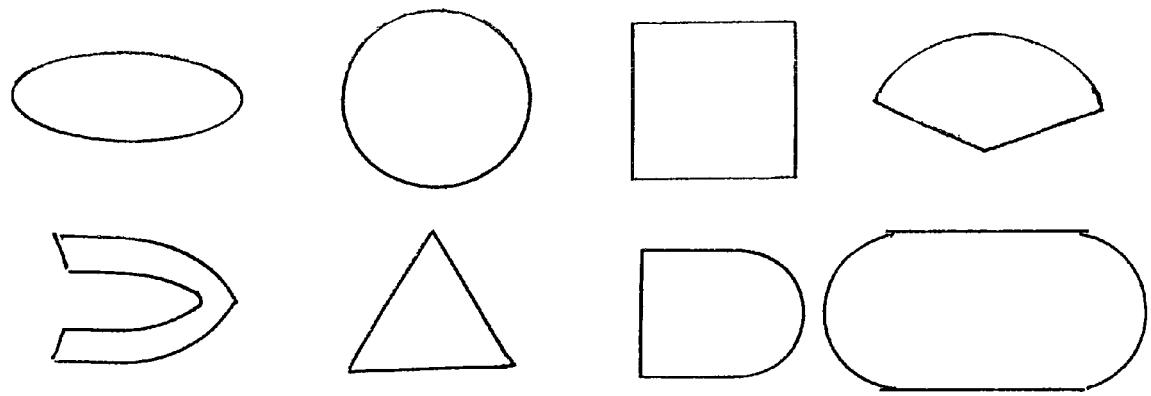
Fig. 2E
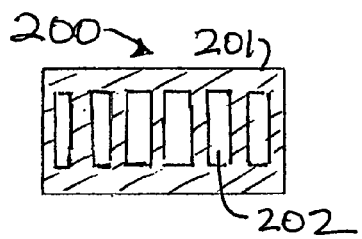 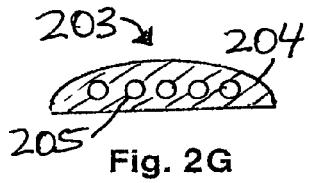 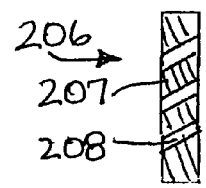
Fig. 2F                Fig. 2G                Fig. 2H
 
Fig. 2I                Fig. 2J

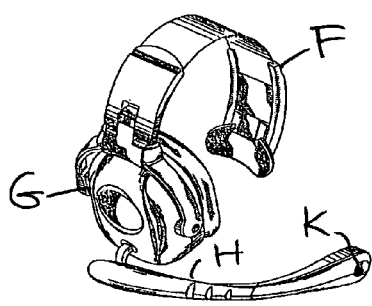
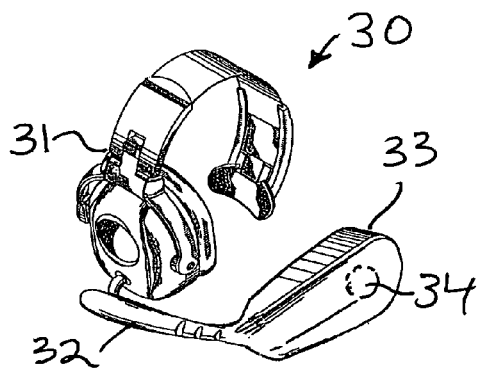
Fig. 3A Prior Art
Fig. 3B
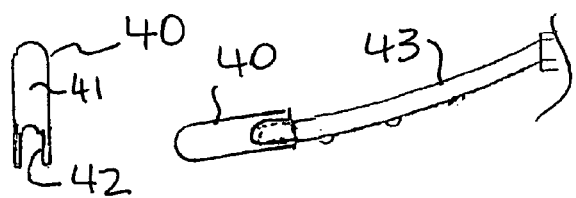
Fig. 4A
Fig. 4B
Fig. 4C
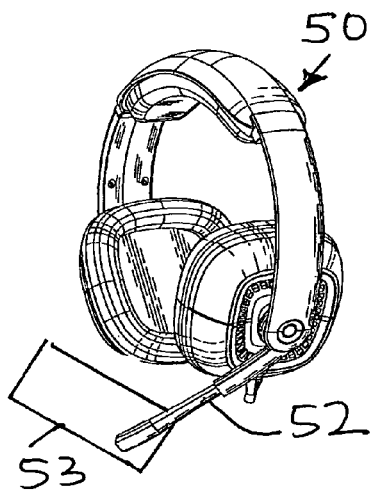
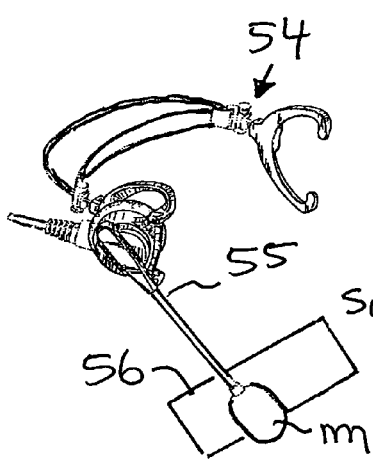
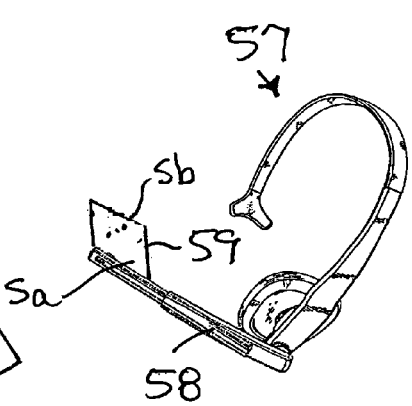
Fig. 5A
Fig. 5B
Fig. 5C

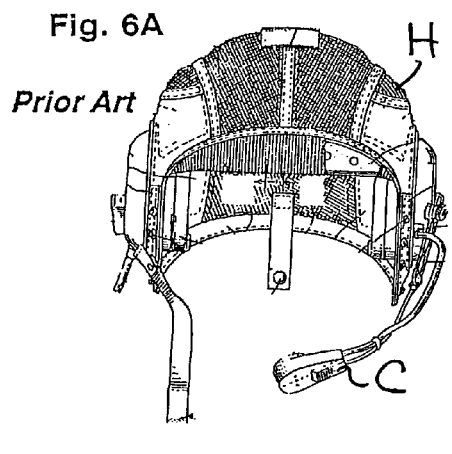
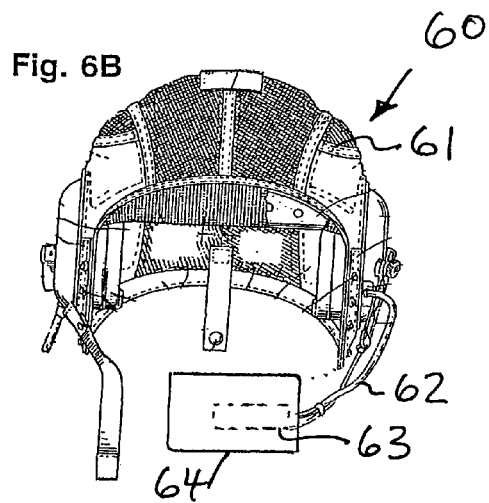
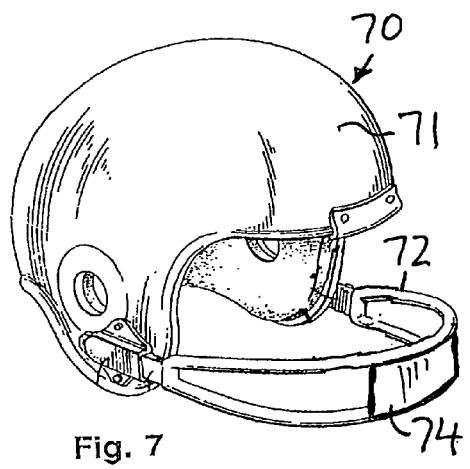
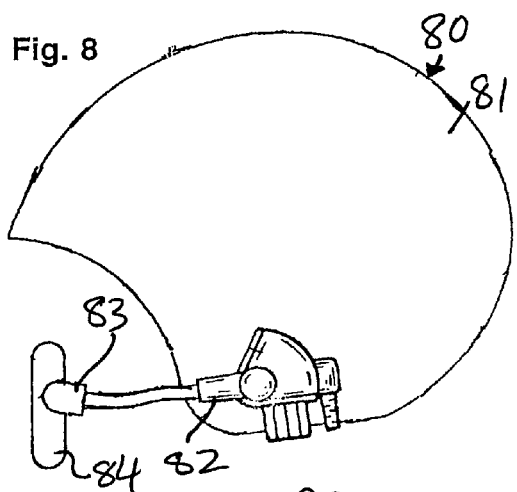
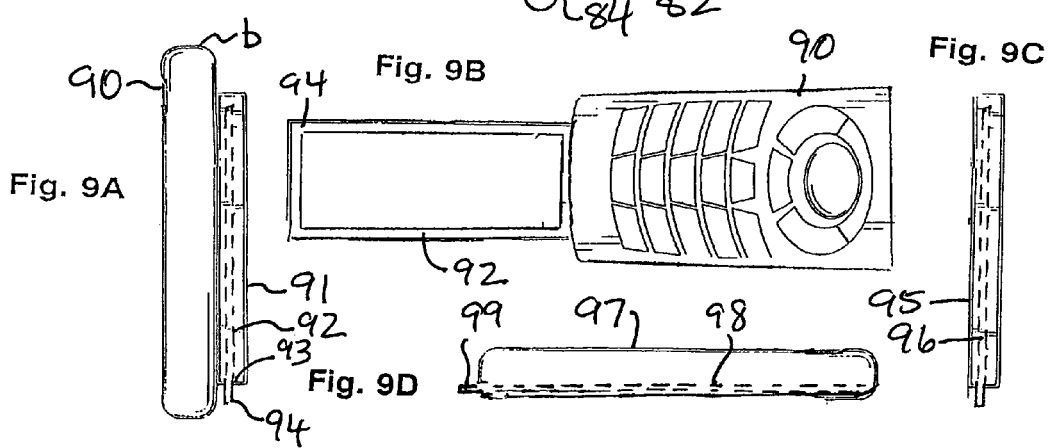

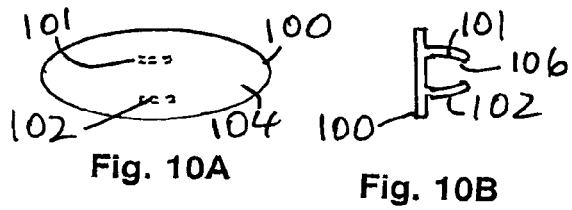
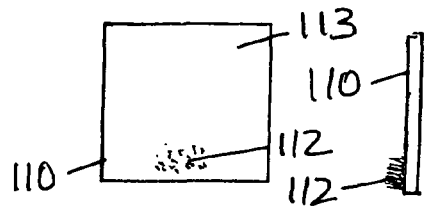
Fig. 10A    Fig. 10B    Fig. 11A    Fig. 11B
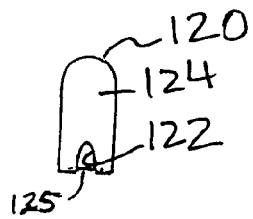
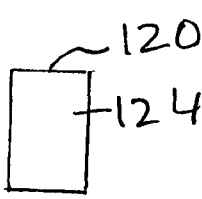
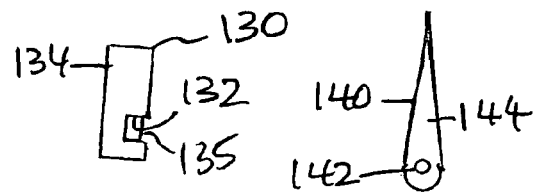
Fig. 12A    Fig. 12B    Fig. 13    Fig. 14
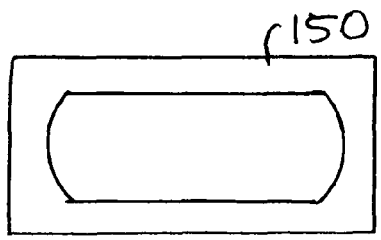
Fig. 15A    Fig. 15B
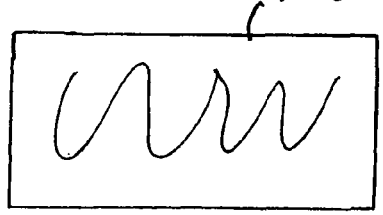
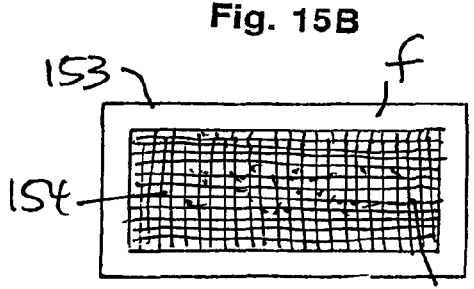
Fig. 15C    Fig. 15D
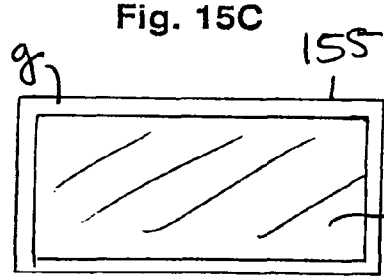
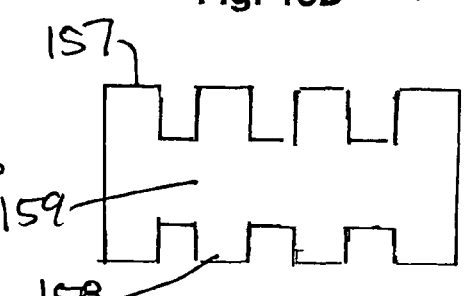
Fig. 15E    Fig. 15F Fig. 18A
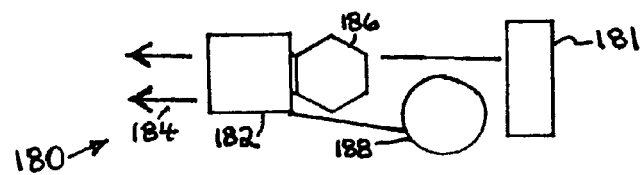
Fig. 18B
Fig. 18C
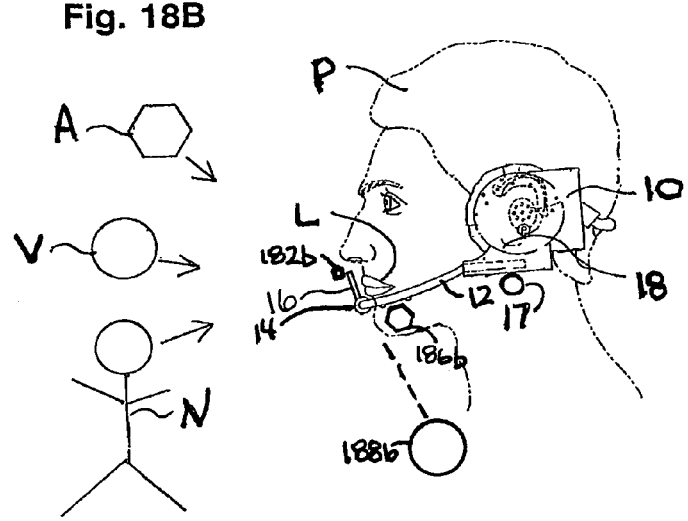
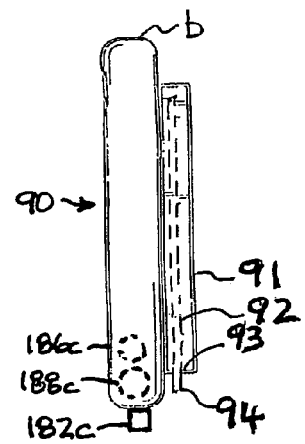
Fig. 18D
Fig. 18E
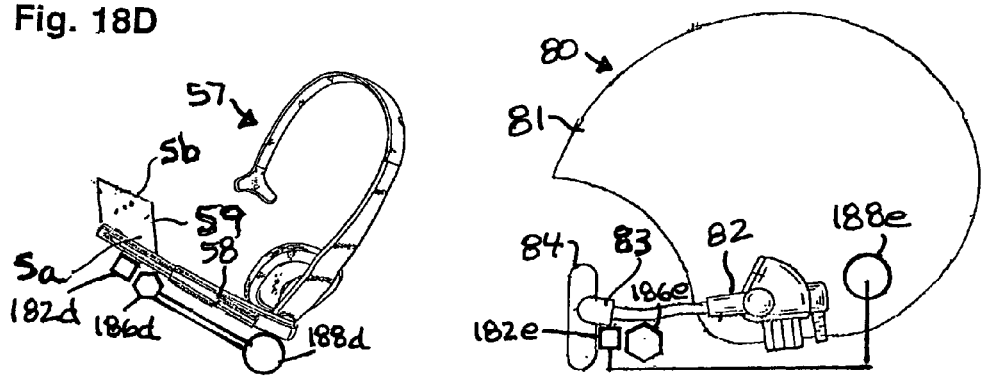

LIPS BLOCKERS, HEADSETS AND SYSTEMS

CROSS-REFERENCE TO RELATED APPLICATION

The benefit of priority, according to the U.S. Patent Laws, is claimed for this invention and application from and based on U.S. Patent Application Ser. No. 61/455,090 filed Oct. 14, 2010 which application is incorporated fully herein for all purposes.

BACKGROUND OF THE INVENTION

1. Field Of the Invention

The present invention is directed to systems and methods for blocking lips of a person speaking, blocking access, including visual and audio access, to what is being spoken by a person into a microphone, cellphone, or other sound receiver. In certain aspects, the present invention is directed to systems for adding material such as anti-viral material, anti-bacterial material, or breath-freshening material to a person's breath.

2. Description of Related Art

In variety of situations and activities, a person communicates with another using a communication device with a microphone, cellphone, or sound receiver positioned adjacent, e.g. in front of, the person's mouth. To prevent the access of someone else to what is being said, often the person holds a hand or another object, e.g. a paper or a clipboard, in front of the mouth so that what is being said into the microphone, etc. cannot be overheard, monitored, or recorded by someone else and/or so that the lips of the person speaking cannot be seen, monitored, or filmed by someone else. For example, and not by way of limitation or by way of exhaustion of pertinent and included scenarios, a person speaks into a cellphone and covers his or her lips with a hand or other object, or a football coach with a microphone headset holds a playbook or clipboard in front of his face while speaking so that an opponent cannot read his lips and cannot hear or discern what is being said. If in such a situation a person or a coach forgets to block his or her mouth, or inadvertently lowers a blocking object or item during speaking, an outsider, third party, spy, or opponent can gain confidential information or valuable information, e.g., trade secrets or information about how to counter what is going to happen on a playing field or in a playing arena. There are various other situations in which it is desirable to prevent others from knowing what a person speaking into a microphone, cellphone, or other sound receiver is saying.

There is a wide variety of known microphones, headsets, cellphones, and sound receivers used by a person in speaking to communicate information to another. Prior patents and applications disclose a variety of such apparatuses and devices, including, but not limited to, those in, and those referred to in or cited in, exemplary U.S. Patents: (all said patents incorporated fully herein for all purposes).

There has long been a need, recognized by the present inventor, for an effective way to inhibit or prevent unauthorized persons from having access to spoken communications for reception by (and possibly for transmission therefrom) a microphone, cellphone, or similar device that are meant only for those intended to receive the communication.

Injurious and/or deleterious living things can be present in a person's breath; for example, bacteria and viruses. There has long been a need, recognized by the present inventor, for an effective way to inhibit or prevent the air-borne transmission of these living things in a person's breath. There has also been a long-felt need for convenient and effective breath freshening of a person speaking.

SUMMARY OF THE PRESENT INVENTION

The present invention, discloses a sound receiver system, e.g., but not limited to a microphone system or headset, with a lips blocker connected thereto. In one aspect, the lips blocker is releasably connected thereto. In one aspect, the lips blocker is selectively movable so that it can be moved, as desired, into and out of a lips blocking position.

In one aspect, a lips blocker according to the present invention has interconnected therewith a movement system which selectively moves the blocker into and away from a lips-blocking position. In one particular aspect, the movement system is activated by an activation device, e.g., a pushbutton or switch which can be on or near the person speaking for activation by the person or which can be remotely activated by someone else. In one particular aspect, the movement system is voice activated so that when the person begins to speak, the blocker is moved into a lips-blocking position. In one aspect, the movement system is remotely activatable so that another person can activate it instead of or in addition to activation by the person speaking.

In one aspect, a lips blocking system according to the present invention includes wording, a logo, a sign, a signal, indicia, information, advertising, or symbol(s). In one particular aspect, the lips blocking system includes a screen (any suitable known screen) which conveys information, wording, a logo, a sign, a signal, indicia, advertising, and/or symbol(s). The screen may be any known screen used with any known system for providing information via a screen, including, but not limited to, an LCD screen, a cellphone screen, a digital screen, a plasma screen, a television screen, computer screen or other electronic display. In one particular aspect, the screen is used to convey specific information to someone who can see the screen.

In one particular embodiment, a lips blocker system according to the present invention has at least a portion or all of it made of sound diffusing material and/or sound insulating material to inhibit or eliminate access to words spoken by a person using the system, e.g., but not limited to, access by voice eavesdropping devices. In one aspect, a system according to the present invention, includes a "white noise" generator to inhibit access to what is being said.

In certain aspects, a blocker according to the present invention (as is true for any embodiment disclosed herein) may be made of plastic, wood, metal, fiberglass, composite, sound insulating material, cellulose, fabric, cloth, non-woven material, woven material, textile material, synthetic material, and natural material or fiber.

In certain aspects, a system according to the present invention provides added material to a person's breath to kill injurious living things in the person's. In certain aspects, a system according to the present invention provides added material to a person's breath to refresh the breath and/or make it smell better.

Accordingly, the present invention includes features and advantages which are believed to enable it to advance communication security technology and disease control technology. Characteristics and advantages of the present invention described above and additional features and benefits will be readily apparent to those skilled in the art upon consideration of the following description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions of embodiments preferred at the time of filing for this patent that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain embodiments of the invention, other objects and purposes will be readily apparent to one of skill in this art who has the benefit of this invention's teachings and disclosures. It is, therefore, an object of at least certain embodiments of the present invention to provide the embodiments and aspects listed above and:

New, useful, unique, efficient, nonobvious lips blocking systems and methods to inhibit or prevent access (visual and/or audio) to speech and/or to the lips of a person speaking.

New, useful, unique, efficient, nonobvious lips blocking systems and methods to muffle and/or dissipate the speech of a person speaking to inhibit or prevent efforts of unauthorized persons and/or devices to the speech.

New, useful, unique, efficient, nonobvious material addition systems for adding material to a person's breath to kill living things, to combat the spread of disease, and/or to freshen a person's breath; and, in certain aspects, such a system used with a blocker according to the present invention.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly, from a cursory inspection or review, the nature and general area of the disclosure of this invention. The Abstract is neither intended to define the invention, which is done by the claims, nor is it intended to be limiting of the scope of the invention or of the claims in any way.

It will be understood that the various embodiments of the present invention (including, but not limited to those described below) may include one, some, or all of the disclosed, described, and/or enumerated features, aspects, and/or improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate embodiments preferred at the time of filing for this patent and are not to be used to improperly limit the scope of the invention which may have other equally effective or legally equivalent embodiments.

FIG. 1 is a side schematic—not to scale—of a prior art system.

FIG. 2A is a side schematic—not to scale—of a system according to the present invention.

FIG. 2B is a front view of a blocker of the system of FIG. 2A according to the present invention.

FIG. 2C is a side schematic—not to scale—of a system according to the present invention.

FIG. 2D is a side schematic—not to scale—of a system according to the present invention.

FIG. 2E is a front view of various blocker shapes system according to the present invention.

FIG. 2F is a front view of a blocker according to the present invention.

FIGS. 2G and 2H are side cross-section views of blockers according to the present invention.

FIG. 2I is a front view of a blocker according to the present invention.

FIG. 2J is a front view of a blocker according to the present invention.

FIG. 3A is a perspective view of a prior art system.

FIG. 3B is a perspective view of a system according to the present invention.

FIG. 4A is a side view of a blocker according to the present invention.

FIG. 4B is a side view of a system according to the present invention with the blocker of FIG. 4A.

FIG. 4C is a side view of the system of FIG. 4B with the blocker of FIG. 4A.

FIG. 5A is a perspective view of a system according to the present invention.

FIG. 5B is a perspective view of a system according to the present invention.

FIG. 5C is a perspective view of a system according to the present invention.

FIG. 6A is a front view of a prior art helmet.

FIG. 6B is a front view of a helmet according to the present invention.

FIG. 7 is a perspective view of a helmet according to the present invention.

FIG. 8 is a side of a helmet according to the present invention.

FIG. 9A is a side view of a cellphone according to the present invention.

FIG. 9B is a top view of the cellphone of FIG. 9A.

FIG. 9C is a side view of part of the cellphone of FIG. 9A.

FIG. 9D is a side of a blocker according to the present invention.

FIG. 10A is a front view of a blocker according to the present invention.

FIG. 10B is a side view of the blocker of FIG. 10A.

FIG. 11A is a front view of a blocker according to the present invention.

FIG. 11B is a side view of the blocker of FIG. 11A.

FIG. 12A is a side view of a blocker according to the present invention.

FIG. 12B is a front view of the blocker of FIG. 12A.

FIG. 13 is a side view of a blocker according to the present invention.

FIG. 14 is a side view of a blocker according to the present invention.

FIG. 15A is a front view of a blocker according to the present invention.

FIG. 15B is a front view of a blocker according to the present invention.

FIG. 15C is a front view of a blocker according to the present invention.

FIG. 15D is a front view of a blocker according to the present invention.

FIG. 15E is a front view of a blocker according to the present invention.

FIG. 15F is a front view of a blocker according to the present invention.

FIG. 18A is a schematic view of a system according to the present invention.

FIG. 18B is a side view of a system according to the present invention.

FIG. 18C is a side view of a phone according to the present invention.

FIG. 18D is a perspective view of a system according to the present invention.

FIG. 18E is a side view of headgear according to the present invention.

Figure 16:
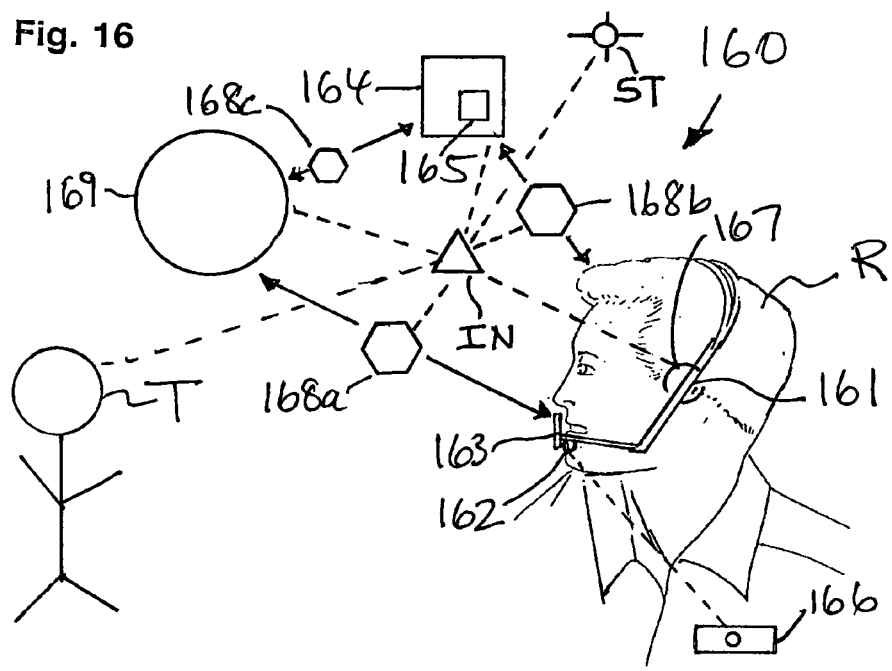
FIG. 16 is a schematic view of a system according to the present invention.

Certain embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of certain embodiments and are not intended to limit the invention or the appended claims. On the contrary, the intention is to cover all modifications, equivalents and alternatives falling within the spirit and scope of the invention as defined by the appended claims. In showing and describing these embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiments, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein. The drawing figures present the embodiments preferred at the time of filing for this patent.

DETAILED DESCRIPTION OF THE INVENTION

Referring now to FIG. 1, a prior art headset system H, as disclosed in U.S. Pat. No. 7,242,765 (incorporated fully herein for all purposes) has a microphone M. No part of the system blocks a view of the lips of a person T using the system. This makes it possible for a person O to see the lips of the person T when the person T using the system is speaking; and this also makes it possible for the person O to read the lips of the person T when the person T speaks. An apparatus or device V for monitoring a speaking person's speech and/or for, in real time, monitoring the lips of the person T, can record the image of the lips while the person speaks, and/or transmit a video of the lips of the person speaking (either a real time image or a recording). An apparatus or device A for monitoring a speaking person's speech and/or for receiving an audio signal can, in real time, monitor the person T while the person T is speaking, record what is spoken by the person T, and/or transmit a real-time signal of what is being said and/or an audio recording of what is said.

FIG. 2A shows a system 10 according to the present invention used by a person P. The system 10 has a headset apparatus 18 with an arm 12 to which is connected a microphone 14 (or a housing for the microphone is formed integrally of the arm). Attached to the microphone 14, or adjacent to the microphone 14 is a lip blocker 16 (see also FIG. 2B) according to the present invention (which may be any blocker disclosed herein according to the present invention—and this is true about any blocker disclosed herein according to the present invention). The blocker 16 blocks lips L of the person P. The microphone may be any suitable known microphone and the headset apparatus may be any suitable known headset apparatus including, but not limited to, those that receive, amplify, and/or transmit what the person P says and/or convey to the person P sound and/or message(s) from another person or source (and this is true for any headset, any headset system, and any microphone of any system disclosed herein according to the present invention).

The blocker 16 is permanently affixed or adhered to the system 10, releasably connected, affixed or adhered thereto, or formed integrally thereof (e.g., but not limited to formed integrally of the microphone, of a microphone cover or cushion, or of an arm like the arm 12—and this is true for any embodiment herein). As is true of any embodiment herein and any blocker herein, the blocker (or any blocker apparatus or structure) may be connected to a part of the sound receiving device or to a part of a headset, microphone, cellphone, computer, or screen with one of fastener, fasteners, adhesive, glue, friction fit, press fit, releasably cooperating structure, releasably cooperating fastener material, VELCRO (trademark) material, and welding; and/or with a clip structure. Also, for any embodiment that is used with any item that has a housing or enclosure, the blocker may be disposed within the housing or enclosure and be movable into and out of the enclosure between a stored position and a lips blocking position.

As shown in FIG. 2A, a person N cannot view the lips of the person P due to the position of the blocker 16 and thus cannot read the lips of the person P when the person P is speaking. An apparatus or device V is prevented from visually monitoring what is said by the person P. An apparatus A used for audio monitoring and/or recording is inhibited or prevented from monitoring what the person P says and from recording it. Optionally the system 10 includes a generator 17 for generating static and/or white noise to counter efforts at monitoring and/or recording the speech of the person P (and any system herein may have such a generator).

FIG. 2C shows a system 20 according to the present invention which has a headset apparatus 24 (shown schematically—e.g. like the headset apparatus 18, FIG. 2A) and arm 23 (e.g., like the arm 12, FIG. 2A) on which or to which is mounted or connected a microphone 22 (e.g., like the microphone 14, FIG. 2A). A blocker 21 according to the present invention, connected to the arm 23, is located and sized so that it blocks a view of the lips of a person using the system 20. The blocker 21 is curved viewed on end.

FIG. 2D shows a system 25 according to the present invention which has a headset apparatus 29 (shown schematically—e.g. like the headset apparatus 18, FIG. 2A) and arm 28 (e.g., like the arm 12, FIG. 2A) on which or to which is mounted or connected a microphone 27 (e.g., like the microphone 14, FIG. 2A). A blocker 26 according to the present invention, connected to the arm 28, is located and sized so that it blocks a view of the lips of a person using the system 25. The blocker 21 is flat.

FIG. 2E shows various possible shapes (front or rear view) for a blocker according to the present invention. This is not an exhaustive listing. A blocker (any disclosed herein) according to the present invention may be any desired suitable shape, configuration, and size so long as it sufficiently blocks a system user's lips so that what the person is saying cannot be monitored or so that their lips cannot be read and/or so that speech of the person speaking is muffled and/or dissipated. It is within the scope of the present invention for any blocker according to the present invention to be any color or colors; and it is also within the scope of the present invention to provide one, two, three or any multiple number of blockers of different color(s) which can be serially or intermittently emplaced on a headset or part thereof to convey information, a signal, or a message.

FIG. 2F shows a blocker 200 according to the present invention that has a body 201 with series of spaced-apart openings 202. The body 201 is sized and the openings 202 are sized and spaced so that in use the blocker 200 prevents the lips of a person using the blocker from being read or from being visually monitored. Also, use of the blocker 200 inhibits or prevents audio monitoring and recording of the speech of person using the blocker 200.

FIG. 2G shows a blocker 203 according to the present invention that has a body 204 with series of spaced-apart holes 205. The body 204 is sized and the holes 205 are sized and spaced so that in use the blocker 203 prevents the lips of a person using the blocker from being read or from being visually monitored. Also, use of the blocker 203 inhibits or prevents audio monitoring and recording of the speech of person using the blocker 203.

FIG. 2H shows a blocker 206 according to the present invention that has a body 207 with series of spaced-apart openings 208. The body 207 is sized and the openings 208 are sized and spaced so that in use the blocker 206 prevents the lips of a person using the blocker from being read or from being visually monitored. Also, use of the blocker 206 inhibits or prevents audio monitoring and recording of the speech of a person using the blocker 206. The openings 208 are slanted or inclined with respect to the sides of the body 207, but they may be at right angles or any desired angle to the sides.

FIG. 2I shows a blocker 209 according to the present invention with a body bearing a symbol, sign, signal, information, advertising, trademark, word(s), indicia, image or logo (all collectively indicated by "information" in some of the claims hereof). Any blocker according to the present invention may have such a symbol, etc. When such a blocker includes a display screen (see, e.g., the screen of FIG. 15A), different and/or alternating symbols, etc. can be displayed (and this is true for any blocker herein that has a screen and any blocker herein may have a screen or include a screen or be a screen).

FIG. 12J shows a blocker according to the present invention that includes a body 212 that is in the shape of a symbol, word(s), trademark, sign, indicia, image or logo ("Logo"). Such a body is sized, shaped and configured so that it not only presents the symbol, etc, but it also blocks a view of the lips of a person using it. Such a body 212 may be produced in any suitable known way, e.g., but not limited to, by molding, casting, cutting, forming, laser cutting, sawing, drilling, etc.

Referring now to FIG. 3A, a prior art headset system F, as disclosed in U.S. Pat. No. D 443,603 (incorporated fully herein for all purposes) has a headset apparatus G, an arm H and a microphone K.

As shown in FIG. 3B, a system 30 according to the present invention has a headset apparatus 31, an arm 32, a blocker 33 according to the present invention, and a microphone 34 within or connected to the blocker 33. The blocker 33 is larger than the microphone K, FIG. 3A, and the blocker 33 is sufficiently large and appropriately located to block the view of the lips of a person using the system 30 while the person is speaking.

FIG. 4A shows a blocker 40 with a body 41 having a notch 42 in an end thereof. The notch 42 is sized to receive and releasably hold (e.g., by friction fit and/or with adhesive and/or with a fastener) a portion of an arm of a headset and to rotate on such an arm. As shown in FIG. 4B the blocker 40 is in position on an arm 43 of a headset (shown partially). In the position of FIG. 4B, the blocker 43 is in a "down" orientation and does not necessarily block the lips of a user of the headset. As shown in FIG. 4C, the blocker 40 has been turned on the arm 43, with the blocker 40 rotating on the arm, to an "up" position in which the blocker 40 will block the lips of a user of the headset.

FIGS. 5A-5C illustrate headsets according to the present invention with a variety of microphones, arms, and parts and each with a lips blocker according to the present invention. FIG. 5A shows a headset system 50 with an arm 52 having a microphone in an end thereof with a blocker 53 according to the present invention connected to the arm 52. A headset without the improvements of the present invention is shown in U.S. Pat. No. D589,492 (incorporated fully herein for all purposes). As is true for any blocker according to the present invention, the blocker 33 can be connected (or formed integrally of) the microphone or a microphone cover, housing, enclosure, support arm, or cushion.

FIG. 5B shows a headset system 54 with an arm 55 having a microphone "m" on an end thereof with a blocker 56 according to the present invention connected to the arm 55. A headset without the improvements of the present invention is shown in U.S. Pat. No. D 616,419 (incorporated fully herein for all purposes).

FIG. 5C shows a headset system 57 with an arm 58 having a microphone therein in an end thereof with a blocker 59 according to the present invention connected to the arm 58. A headset without the improvements of the present invention is shown in U.S. Pat. No. D 540,778 (incorporated fully herein for all purposes).

FIG. 6A shows a prior art helmet H with a headset system having a microphone C on an arm thereof. U.S. Pat. No. 3,786,519 discloses such a helmet (said patent incorporated fully herein for all purposes).

FIG. 6B shows a helmet 60 according to the present invention which is like the helmet H, but with improvements according to the present invention. The helmet 60 has a body 61 and a headset system 62 (in some aspects like that of the helmet of U.S. Pat. No. 3,786,519 which is incorporated fully herein for all purposes, and in one aspect, but for the improvements according to the present invention, like the helmet of this patent). The headset system includes a microphone 63 and a blocker 64 according to the present invention connected to the arm 62.

FIG. 7 shows a helmet 70 according to the present invention with a body 71 and a face mask 72 attached to the body 71. A blocker 74 according to the present invention is attached to the face mask 72 (or formed integrally thereof).

FIG. 8 shows a helmet 80 according to the present invention with a body 81 and a headset system 82 attached to the body 78. The headset system 82 has an arm with a microphone 83. A blocker 84 according to the present invention is attached to the microphone 83.

The blockers in FIGS. 6B-8 are sized and located for blocking the view of the lips of a person wearing the helmets depicted in these figures. These blockers may be any blocker disclosed herein according to the present invention.

FIGS. 9A and 9B show a cellphone 90 according to the present invention which has a body "b" and a holder 91 attached thereto (or formed integrally thereof). A blocker 92 according to the present invention is movably disposed in the holder 91. An optional end 94 of the blocker 92 projects from the holder 91 and can be pulled out, as shown in FIG. 9B, to a position in which the blocker 92 can block a view of the lips of a person using the cellphone 90.

It is within the scope of the present invention to provide a system 95 with a movable blocker 96 therein that can be used with another item, e.g. but not limited to, with a cellphone. In one aspect, the system 95 is connected, permanently or releasably, to a cellphone in such a location that moving the blocker 96 out from the system 95 (e.g. as the blocker 92 is movable as shown in FIG. 9B) moves the blocker 96 to a lips-view-blocking position.

It is within the scope of the present invention to provide a housing with a movable blocker therein. FIG. 9D shows a system 97 according to the present invention with a blocker 98 according to the present invention movably disposed therein. An optional end 99 of the blocker 98 projects from the system 97 and can be grasped by a person to move the blocker 98 into and out of the system 97.

FIGS. 10A and 10B show a blocker 100 according to the present invention which has a body 104 and a clip structure 106 that includes two arms 101, 102. The clip structure 106 is releasably emplaceable on or around a part of a headset (e.g. on a support arm or on a microphone of a headset) or other item (e.g., but not limited to, a cellphone, a computer with a webcam and a microphone, or a computer with a microphone) in such a position that the body 104 blocks a view of the lips of a person using the blocker 100.

FIGS. 11A and 11B show a blocker 110 according to the present invention which has a body 113 and an amount of releasably cooperating structure or fastener material (e.g., but not limited to, VELCRO (trademark) material). The blocker 110 is releasably connectible to a corresponding amount of releasable cooperating structure or fastener material on a part of a headset (e.g. on an arm or microphone of a headset) or other item (e.g., but not limited to, a cellphone) in such a position that the body 113 blocks a view of the lips of a person using the blocker 110. As is true for any embodiment herein, the blocker 110 can be connected, adhered with adhesive, and/or connected with fastener(s) to another thing.

FIGS. 12A and 12B show a blocker 120 according to the present invention which has a body 124 and a notch 122 which is releasably emplaceable on or around a part of a headset (e.g. on an arm or microphone of a headset) or other item (e.g., but not limited to, a cellphone, a computer with a webcam and a microphone, or a computer with a microphone) in such a position that the body 124 blocks a view of the lips of a person using the blocker 120. The blocker 120 can be rotated on the part on which it is emplaced with the part remaining within the notch 122. Optionally, a part or shaft 125 is emplaced once the blocker 120 has been positioned on a thing to hold the blocker in place.

FIG. 13 shows a blocker 130 according to the present invention which has a body 134 and a recess 132 which is releasably emplaceable on or around a part of a headset (e.g. on an arm or microphone of a headset) or other item (e.g., but not limited to, a cellphone a computer with a webcam and a microphone, or a computer with a microphone) in such a position that the body 134 blocks a view of the lips of a person using the blocker 130. Optionally, a part or shaft 135 is emplaced once the blocker 130 has been positioned on a thing to hold the blocker in place.

FIG. 14 shows a blocker 140 according to the present invention which has a body 144 and a hole 142 which is sized to receive a part of a headset (e.g. on an arm or microphone of a headset) or other item (e.g., but not limited to, a cellphone). The blocker 140 is disposable in such a position that the body 144 blocks a view of the lips of a person using the blocker 140. The blocker 140 can be rotated on the part on which it is emplaced with the part remaining within the hole 142.

FIG. 15A shows a blocker 150 according to the present invention which is a screen for displaying information. Such a display may be simply an "On/Off" screen and the information is conveyed by turning the screen on or off or both; or such a display may be a screen that flashes one color, multiple colors, or alternating colors once or periodically. Optionally, the screen conveys information the way a television screen or cellphone screen or computer screen conveys information and the screen is the screen of any of these items (or the screen of any known item, apparatus or thing that displays information).

FIG. 15B shows a blocker 151 according to the present invention that is a piece of translucent material, not transparent.

FIG. 15C shows a blocker 152 according to the present invention that has a mirrored surface or that is a mirror.

FIG. 15D shows a blocker 153 according to the present invention that has a frame "f" and a screen mesh 154 covering the frame opening.

FIG. 15E shows a blocker 155 that has a frame "g" and a piece of fabric, cloth, cardboard, membrane, or paper 156 covering the frame opening.

It is within the scope of the present invention for any blocker according to the present invention to contain, be coated with, and/or to have therein or thereon one or more of sterilizing material, antifungal material, antibacterial material, antiviral material, mouthwash, mouth freshener material, and/or scent material (all of these collectively referred to as "added material"). For example, the blocker of FIG. 2A, the screen mesh 154, and the fabric etc. 156 and any blocker in FIGS. 2E-2H, 4A-8, 9A-17B may contain or have any of these materials therein and/or thereon. By way of example, the mesh 154 is shown with added material 154m (indicated by dots; not to scale).

FIG. 15F shows a blocker 157 that has a body 159 and a plurality of spaced-apart projections 158 extending from the body 159.

FIG. 16 illustrates a system 160 according to the present invention and the use of a blocker 163 according to the present invention. Any blocker according to the present invention may be used for the blocker 163.

A person R, as shown in FIG. 16, has a headset system 161 (may be any suitable headset system including, but not limited to, any referred to herein, that can receive and/or transmit the speech of the person R and receive signals and/or messages conveyed to the person R via one or more earphones 167). The person R can selectively activate the headset system 161 using an optional pushbutton device 166. The headset 161 has a microphone 162 into which the person R can speak. The blocker 163 blocks the view of the lips of the person R when the person R is speaking so that an observer, e.g. a person T, cannot read the lips of the person R; but the person T can and does view the front of the blocker 163 and information or image(s) on the front of the blocker 163 can be viewed and seen by the person T; and the person T can see the blocker 163 (which has, is, or includes a screen) go On and/or Off and/or can see provide a display and/or blink and/or flash a color, colors, or different colors intermittently, alternately, and/or periodically.

Any person, entity or device 169 within view of the person R can see the blocker 163 and can be in communication with the headset 161 and with the blocker 163 via a suitable communication system 168a. The person, etc. 169 can communicate information and/or messages to the person R (for the person R to hear via the headset 161) and/or the person, etc. 169 can send signals, images and/or information directly to the blocker 163 for display on the blocker 163 when the blocker 163 includes a display screen (see, e.g., the blocker of FIG. 15A). A person T can then view what is displayed on the blocker 163 that has been conveyed by the person, etc. 169.

The person R can respond to the person, etc. 169 with gestures and/or via the system 168a by speaking into the microphone 162 and vice-versa. Communication between any system according to the present invention and any other person, apparatus, device or system can be done via wires and/or cables, via a satellite communications systems ST, via a network IN (e.g. a local network and/or the Internet) and/or wirelessly. The arrows in FIG. 16 may indicate wires or cables or wireless communication. The systems in FIG. 16 may be wireless systems and/or may each include wireless communications devices and/or apparatuses.

A person, entity, or device 164 not within the view of the blocker 163 (and, in one aspect, remote from the person R and remote from the person, etc. 169) can communicate with the person R via a communication system 168b and with the person, etc. 169 via a communication system 168c (and via satellite ST and/or via network IN). The person, etc. 164 can communicate with the person R and/or with the blocker 163 in the same way as the person, etc. 169. The entity or device 164, when it is not a person, can include a display 165 which presents a display of the blocker 163 so that the front of the blocker 163 can be viewed in real time. When it is a person 164, such a display can be provided on a display screen (e.g., a screen of the display 165) to the person so that the person can view the blocker 163 in real time. A real-time and/or time-delayed recording of the blocker 163 can also be provided.

Optionally, a blocker system according to the present invention has a blocker that is moved into and out of lip blocking position by a movement apparatus. Such a blocker may be moved selectively by a person using it or by someone else who has control of the movement apparatus (e.g., but not limited to, any person in FIG. 16). In one aspect such a movement apparatus for a blocker according to the present invention is activated by a voice activation device so that whenever a person with a system according to the present invention with a blocker according to the present invention begins to speak, the movement apparatus moves the blocker into lip blocking position.

Figure 17A:
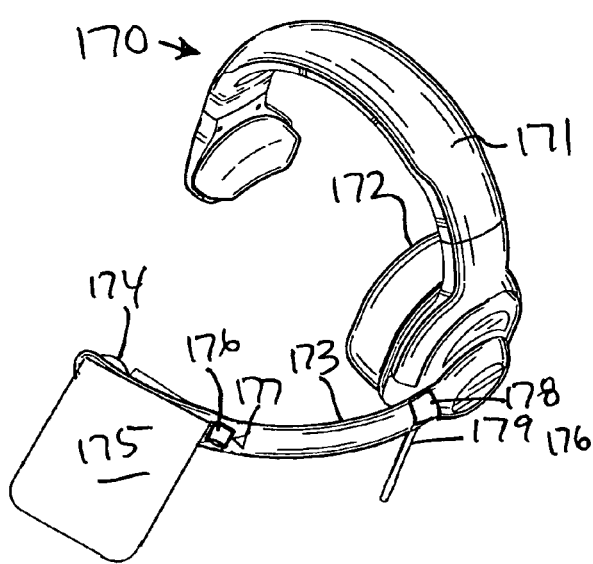
FIG. 17A is a perspective, partially schematic view of a system according to the present invention.
Figure 17B:
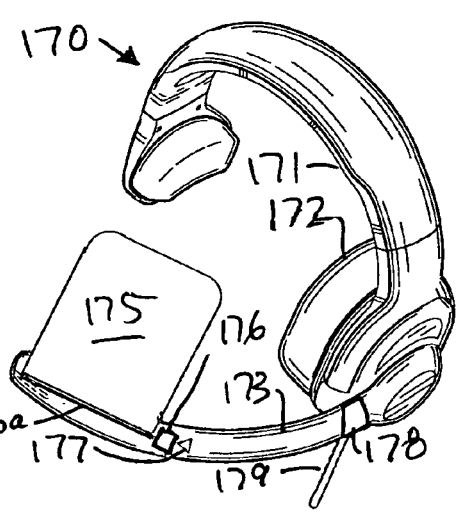
FIG. 17B is a perspective, partially schematic view of the system of FIG. 17A.

FIGS. 17A and 17B show a system 170 according to the present invention that has a headset system 171, an earphone 172, a support arm 173, a microphone 174 on the support arm 173, a blocker 175, movement apparatus 176 (shown schematically) connected with the blocker 175, and, optionally, voice activation apparatus 177 connected to the movement apparatus 176.

The movement apparatus 176 may be any suitable know movement apparatus for moving a thing like the blocker 175. In one aspect, the movement apparatus has a shaft 176a that is selectively rotatable by the movement apparatus 176 (e.g., with a motor), from a lower non-lip-blocking position as shown in FIG. 17A to a raised lip-blocking position as shown in FIG. 17B.

Optionally, the system 170 has voice activation apparatus 177 which controls the movement apparatus 176. When a person using the system 10 begins to speak, the voice activation apparatus signals the movement apparatus to move the blocker 175 into lip-blocking position.

Optionally, the system 170 includes a wireless communication system 178 (shown schematically) and an antenna 179 for the system 178. Any headset according to the present invention may be equipped for wireless communication.

It is within the scope of the present invention, in at least some embodiments, to provide headgear with an added material system according to the present invention for providing added material around or adjacent a person's mouth and/or as an addition to a person's breath when breath is expelled, e.g., during speech, during a cough, or during a sneeze. Headgear may include helmets, protective head enclosures (flexible or solid), caps, and hats. Headgear may include any blocker disclosed herein. Headgear may have a blocker including a screen.

The "added material" may be sterilizing material, antifungal material, antibacterial material, antiviral material, mouthwash, mouth freshener material, antiseptic material, and/or scent material (all of these collectively referred to as "added material").

A system 180 according to the present invention as shown in FIG. 18A has an ejector 182 from which added material 184 is ejected. The ejector 182 is located adjacent or near a person's mouth, e.g., with appropriate connection to part of a headset or other thing (e.g., cellphone, headgear), so that when breath exits the person's mouth, added material is added to the breath.

An activator 186 connected to the ejector and/or in communication with the ejector activate the ejector 182. The activator 186 may operate automatically in response to expelled breath and/or it may be activated by the person with the ejector and/or by another person near the person with the ejector or by another person observing the person with the ejector—observing in the presence of the person with the ejector or observing remotely, with or without a camera which provides real-time observation.

The activator 186 may be voice activated, movement activated, temperature activated, or pressure activated.

Optionally, the system 180 includes a container 188 of added material supplied to the ejector 182. The container 188 may be connected to a thing 181; it may be carried on a person or on equipment near a person; and/or it may be in material communication with the ejector 182 providing the added material as needed.

The system 180 may be used as a stand-alone system near or adjacent a person's mouth; or as shown in FIG. 18A, the system 180 may be used with a thing 181 (which may be any thing disclosed herein according to the present invention with a blocker, optionally with the blocker deleted).

FIG. 18B shows an embodiment of a system 180 according to the present invention used with the system 10 shown in FIG. 2A. An added material ejector 182*b* is connected to the blocker 16 and an activator 186*b* is connected to the arm 12. Optionally, a container 188*b* provides added material to the ejector 182*b*.

FIG. 18C shows an embodiment of a system 180 according to the present invention used with the phone 90 shown in FIG. 9A. An added material ejector 182*c* is connected to the phone and an activator 186*c* is located within the phone. Optionally, a container 188*c* within the phone provides added material to the ejector 182*c*.

FIG. 18D shows an embodiment of a system 180 according to the present invention used with the headset shown in FIG. 5C. An added material ejector 182*d* and an activator 186*d* are connected to the headset. Optionally, a container 188*d* connected to the headset provides added material to the ejector 182*d*.

FIG. 18E shows an embodiment of a system 180 according to the present invention used with the helemt shown in FIG. 8. It is to be understood that such a system may be used with any headgear. An added material ejector 182*e* and an activator 186*e* may be connected to any suitable part of the helmet, or, as shown, they may be connected to the headset as shown. Optionally, a container 188*e* connected to the helmet provides added material to the ejector 182*d*. An ejector for any embodiment of the present invention (including but not limited to those of FIGS. 18A-18E) may be any suitable known apparatus or device for providing a stream, mist, or spray of the added material. Known fluid spray systems, misters, and aerosol apparatuses and devices may be used.

The present invention, therefore, provides, in at least certain embodiments, systems for inhibiting access to the lips of a speaking person, such systems, in some aspects, including: a sound receiving device for receiving speech of a person speaking, the person having lips that move when the person speaks, and a blocker adjacent to and/or connected to the system for blocking the lips of the person speaking while the person is speaking. Such systems may have one or some, in any possible combination, of the following: the blocker releasably connected to a part of the sound receiving device; the blocker movably connected to a part of the sound receiving device; the blocker made of at least one of or a combination of plastic, metal, wood, composite, fiberglass, sound insulation material, cellulose, woven material, nonwoven material, synthetic material, natural material, fibrous material, fibers, sound muffling material, sound dissipating material; the sound receiving device is one of microphone, computer, headset, and cellphone; the blocker movably connected to the sound receiving device for movement to and from a lips blocking position, the blocker either connected exteriorly of the sound receiving device or the blocker located initially within a housing or enclosure and movable therefrom, and movement apparatus for moving the blocker to and from the lips blocking position; the movement apparatus is a shaft, the blocker connected to the shaft, and a motor for moving shaft to move the blocker to and from the lips blocking position; activation apparatus for activating the movement apparatus; the activation apparatus being one of device locally activatable by the person speaking, device locally activatable by a person other than the person speaking, pushbutton device locally or remotely activatable, device remotely activatable by a person other than the person speaking, device remotely activatable by a remote activation device, device voice activatable by voice activation apparatus in communication with the movement apparatus, and device voice activatable by voice activation apparatus connected to the sound receiving device, said devices and/or said devices and apparatuses being in wired communication with each other or in wireless comunication with each other; the blocker including a viewable screen; the screen viewable by a person other than the person speaking and/or by the person speaking; the blocker including two screens including a first screen viewable by the person speaking and a second screen viewable by a person other than the person speaking; the blocker having thereon information viewable by the person speaking and/or by a person other than the person speaking; the blocker including at least one screen and the at least one screen can display information; the blocker is in the shape of one of word, words, symbol, logo, trademark, sign, and indicia; the blocker has a shape as viewed from the front or rear of any shape disclosed herein for a blocker and/or is a square, diamond, rectangle, elllipse, octagon, hexagon, oval, triangle, pentagon, or shape of a logo; the blocker is connected to part of the sound receiving system by one of releasable connection, movable connection, or by being formed integrally thereof; the sound receiving device includes a support arm supporting the microphone and the blocker is on the support arm; the blocker has at least one opening therethrough or a series of spaced-apart openings therethrough; the blocker has at least one color thereon or different colors thereon or multiple areas of colors thereon, some the same some different; the part of the sound receiving device having a device shape and the blocker having a blocker opening with a blocker shape, a portion of the part of the device with the device shape receivable within the blocker opening; the blocker rotatable on the part of the sound receiving device; the blocker connected to the part of the sound receiving device with one of fastener, fasteners, adhesive, glue, friction fit, press fit, releasably cooperating structure, releasably cooperating fastener material, VELCRO (trademark) material, and welding; the sound receiving device including a housing or enclosure and the blocker movably storeable within the housing or enclosure for selective movement therefrom from a stored position within the housing or enclosure to an extended position outside the housing or enclosure in a lips blocking position; the sound receiving device including a helmet for wearing by the person speaking; the sound receiving device including one of wired communication apparatus for wired communication with the sound receiving device or wireless communication apparatus for wireless communication with the sound receiving device; and/or communication apparatus for communication with the blocker, the communication apparatus being one of wired communication apparatus or wireless communication apparatus, such communication apparatus in one aspect for communication with a screen or screens of the blocker.

The present invention, therefore, in at least some embodiments, provides methods for blocking lips of a speaker, the methods including using any blocker disclosed herein and, in some aspects, including: positioning a system with a sound receiving device adjacent lips of a speaking person, the sound receiving device for receiving speech of the person speaking, the person's lips moving when the person speaks, and positioning in front of the lips of the person speaking a blocker connected to the system for blocking the lips of the person speaking while the person is speaking.

The present invention, therefore, in at least some embodiments, provides headsets, cellphones, computers, microphones, and sound receiving systems for receiving speech of a person speaking, such items including any blocker disclosed herein and, in one aspect, including: a sound receiving device for receiving speech of a person speaking, the person having lips that move when the person speaks, a blocker connected to the system for blocking the lips of the person speaking while the person is speaking.

The present invention, therefore, in at least some embodiments, provides helmets including any blocker disclosed herein and, in some aspects, a helmet including: a helmet body, a sound receiving device connected to the helmet for receiving speech of a person speaking and wearing the helmet, the person having lips that move when the person speaks, a blocker connected to a part of the helmet or to the sound receiving device, the blocker for blocking the lips of the person speaking while the person is speaking. Such a helmet may have a blocker including a screen.

The present invention, therefore, in at least some embodiments, provides a headset, cellphone, or headgear with an added material system according to the present invention which according to the present invention provides added material around or adjacent a person's mouth and/or as an addition to a person's breath when breath is expelled, e.g., during speech, during a cough, or during a sneeze. Headgear may include helmets, protective head enclosures and coverings (flexible or solid, airtight or not), caps, and hats. Headgear may include any blocker disclosed herein. Headgear may have a blocker including a screen. Any headset, helmet, phone, or thing disclosed herein may have an added material system according to the present invention.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. The inventor may rely on the Doctrine of Equivalents to determine and assess the scope of the invention and of the claims that follow as they may pertain to apparatus and/or methods not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

What is claimed is:

1. A system for inhibiting access to the lips of a speaking person comprising a sound receiving device for receiving speech of a person speaking, the person having lips that move when the person speaks, a blocker positionable adjacent the lips of the person speaking for blocking the lips of the person speaking while the person is speaking, and material addition apparatus adjacent the blocker for adding added material near the lips of the person speaking.

2. The system of claim 1 wherein the added material is one of killing material for killing living things in the breath of the person speaking, sterilizing material, antifungal material, antibacterial material, antiviral material, mouthwash, mouth freshener (material, antiseptic material, scent material, and breath freshening material.

3. The system of claim 2 wherein the added material can be added when a person's breath is expelled, during a cough or during a sneeze.

4. The system of claim 1 wherein the sound receiving device comprises one of microphone, webcam, computer, helmet, headset, and cellphone.

5. The system of claim 1 wherein the blocker is movably connected to a part of the sound receiving device for movement to and from a lips blocking position.

6. The system of claim 5 further comprising movement apparatus for moving the blocker to and from a lips blocking position.

7. The system of claim 6 further comprising activation apparatus for activating the movement apparatus, the activation apparatus being one of: device locally activatable by the person speaking, device locally activatable by a person other than the person speaking, push-button device locally or remotely activatable, device remotely activatable by a person other than the person speaking, device remotely activatable by a remote activation device, device voice activatable by voice activation apparatus in communication with the movement apparatus, and device voice activatable by voice activation apparatus connected to the sound receiving device.

8. The system of claim 1 wherein the blocker includes a viewable screen, the viewable screen viewable by one of the person speaking and a person other than the person speaking.

9. The system of claim 1 is in the shape of one of word, words, color, symbol, logo, trademark, sign, and indicia.

10. The system of claim 1 wherein the sound receiving device includes a housing and the blocker is movably storable within the housing for selective movement therefrom from a stored position within the housing to a position outside the housing in a lips blocking position.

11. The system of claim 1 wherein the sound receiving device includes one of: wired communication apparatus for wired communication with the sound receiving device; and wireless communication apparatus for wireless communication with the sound receiving device.

12. The system of claim 1 further comprising a headgear comprising a body, the sound receiving device connected to the headgear for receiving speech of a person speaking and wearing the headgear, the blocker connected to a part of the headgear or to the sound receiving device.

13. The system of claim 12 wherein the headgear is one of: hat, cap, helmet, flexible head covering, and solid head covering.

14. The system of 1 wherein the blocker has thereon information viewable by a person other than the person speaking.

15. The system of claim 1 further comprising
communication system for communication with the blocker, the communication system being one of wired communication system or wireless communication system.

16. The system of claim 15 further comprising
the communication system for communicating with a network,
the network being one of a local network and the Internet.

17. A method for selectively blocking lips of a person who is speaking with a blocker, the blocker movably connected to a member for selective movement to block a view of the lips of the person who is speaking, the person using a sound device including an apparatus into which the person speaks, the sound device including the member to which the blocker is movably connected, at least part of the sound device positionable adjacent the lips of the person, the sound device including material addition apparatus for adding added material near the lips of the person speaking, the method comprising positioning at least part of the sound device adjacent the lips of the speaker, connecting the blocker to the sound device in proximity to the lips of the person, said connection being a movable connection of the blocker to the sound device so that the blocker is movable with respect to the sound device, moving the blocker into position in front of the lips of the person so that, when the person speaks and the person's lips are moving, reading the lips of the person is inhibited by the blocker blocking the view of the lips of the person, and with the material addition apparatus, adding material near the flips of the person.

18. The method of claim 17 wherein the added material is one of killing material for killing living things in the breath of the person speaking, sterilizing material, antifungal material, antibacterial material, antiviral material, mouthwash, mouth freshener material, antiseptic material, scent material, and breath freshening material.

19. The method of claim 18 wherein the added material is added when a person's breath is expelled, during a cough or during a sneeze.

20. The method of claim 17 wherein the sound device is a sound receiving device, and the sound receiving device comprises one of microphone, webcam, computer, helmet, headset, and cellphone.

* * * * *